United States Patent
Tolstorukov et al.

(10) Patent No.: US 12,497,641 B2
(45) Date of Patent: Dec. 16, 2025

(54) METHODS OF MAKING CHITOSAN

(71) Applicant: MyKito Sciences Inc, San Marino, CA (US)

(72) Inventors: Ilya Tolstorukov, Claremont, CA (US); Charles Taylor, Claremont, CA (US); Animesh Ray, Claremont, CA (US); Cameron Bardliving, Blue Bell, PA (US); Brent Chamberlain, Claremont, CA (US)

(73) Assignee: Mykito Sciences Inc, San Marino, CA (US)

( * ) Notice: Subject to any disclaimer, the term of this patent is extended or adjusted under 35 U.S.C. 154(b) by 0 days.

(21) Appl. No.: 18/601,266

(22) Filed: Mar. 11, 2024

(65) Prior Publication Data
US 2025/0092435 A1 Mar. 20, 2025

Related U.S. Application Data

(63) Continuation of application No. 16/972,541, filed as application No. PCT/US2019/035946 on Jun. 7, 2019, now abandoned.

(51) Int. Cl.
- *C12P 19/26* (2006.01)
- *C12N 1/16* (2006.01)
- *C12N 1/18* (2006.01)
- C08B 37/08 (2006.01)
- *C12R 1/85* (2006.01)

(52) U.S. Cl.
CPC ........... *C12P 19/26* (2013.01); *C12N 1/16* (2013.01); C08B 37/003 (2013.01); *C12R 2001/85* (2021.05)

(58) Field of Classification Search
None
See application file for complete search history.

(56) References Cited

U.S. PATENT DOCUMENTS

| 6,890,913 | B2 | 5/2005 | Chan et al. |
| 6,896,809 | B2 | 5/2005 | Qian et al. |
| 2005/0042735 | A1 | 2/2005 | Deng et al. |
| 2006/0277632 | A1 | 12/2006 | Carr et al. |

FOREIGN PATENT DOCUMENTS

| CN | 103436481 | 12/2013 |

OTHER PUBLICATIONS

Zhang et al., "Applied Usage of Yeast Spores as Chitosan Beads," Appl. Environ. Microbiol. 80:5098-5105, 2014 (Year: 2014).*
Aaron M Neiman, "Ascospore Formation in the Yeast *Saccharomyces cerevisiae*", Microbiology and Molecular Biology Reviews, vol. 69, No. 4, pp. 565-584, Dec. 2005.
Pochanavanich and Suntornsuk, "Fungal chitosan production and its characterization", Letters in Applied Microbiology, vol. 35, pp. 17-21, Mar. 2002.
PCT International Search Report—Written Opinion, Aug. 16, 2019.
European Search Report, EP 19815893, Mar. 11, 2022.
Xu and West, "Protein Synthesis During Germination Of Heterothallic Yeast Ascospores", Experientia, vol. 48, pp. 786-788, 1992.
Briza et al, "Dityrosine Is A Prominent Component of The Yeast Ascospore Wall", A Journal of Biological Chemistry, 261(9), pp. 4288-4294, Mar. 1986.
Briza et al, "Chemical Composition Of The Yeast Ascospore Wall", Journal of Biological Chemistry, 263(23), pp. 11569-11574, Aug. 1988.

\* cited by examiner

*Primary Examiner* — David Steadman
(74) *Attorney, Agent, or Firm* — Craig A Crandall, APC; Craig Acrandall

(57) ABSTRACT

A method for making a chitosan product from yeast cells is disclosed herein. Yeast cells are cultured to form a biomass of yeast cells. The yeast cells are induced to undergo meiosis causing the yeast cells to form asci containing ascospores wherein each ascospore contains a chitosan protective layer in the ascospore wall. Chitosan is extracted from the ascospores, purified to form purified chitosan, and precipitated and dried to form a chitosan product.

1 Claim, 9 Drawing Sheets

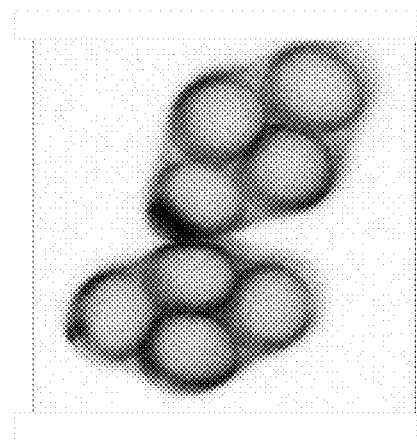
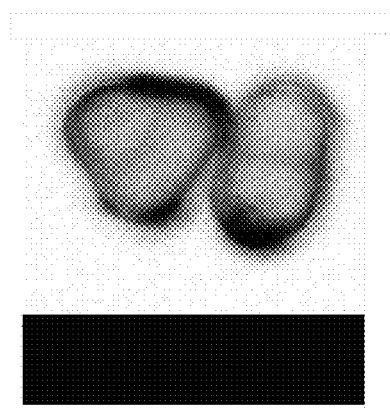
FIG. 7A                    FIG. 7B

METHODS OF MAKING CHITOSAN

RELATED PATENT APPLICATIONS

This application is a Continuation Application of U.S. application Ser. No. 16/972,541, filed Dec. 4, 2020, which is a U.S. National Stage Application pursuant to 35 U.S.C. § 371 of PCT/US2019/035946, filed Jun. 7, 2019, which claims benefit of U.S. Provisional Application No. 62/682,245, filed on Jun. 8, 2018, each incorporated in its entirety by reference herein.

TECHNICAL FIELD

The present disclosure relates to methods for making a chitosan product from the ascospores of yeast cells.

BACKGROUND

Chitosan is a polysaccharide that may be used in a variety of industries in different products. In some examples, chitosan may be used as a flocculating agent, excipient, or anti-microbial agent in products across multiple industries. In addition, chitosan may be used in therapeutic applications. Currently, chitosan is primarily sourced from crustacean shells using an extraction process that involves treatment with harsh chemicals. Chitosan obtained from animal sources can be contaminated with heavy metals, induce allergic response to shellfish proteins, and have variability material attributes, making it especially problematic for use in biomedical industries. Chitosan obtained from a non-animal source does not have these problems.

BRIEF DESCRIPTION OF THE DRAWINGS

Features and advantages of examples of the present disclosure will be apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 7A is a confocal microscopy image of a *Saccharomyces cerevisiae* ascus from the dit1 mutant yeast strain that is stained with Calcofluor White. FIG. 7B is a confocal microscopy image of a *Saccharomyces cerevisiae* ascus from a wild-type yeast strain that is stained with Calcofluor White.

MODE(S) FOR CARRYING OUT THE INVENTION

It is believed that examples of the method for making a chitosan product disclosed herein produce chitosan from a non-animal source in fewer steps, which may produce chitosan using less time and labor, and fewer resources when compared to other known methods, thus providing an important advancement to the state of the art of chitosan production. With many methods, it may be difficult to obtain a purified product of chitosan without chemically converting chitin to chitosan. For example, some methods used to produce chitosan from a non-animal source may require a deacetylation step to convert chitin to chitosan by removing acetyl groups on chitin to achieve a purified chitosan product.

Generally, while some fungi may contain chitosan in the vegetative cell walls, yeast only contain chitin in the vegetative cell walls. As such, as previously mentioned, when producing chitosan from vegetative cell walls of yeast, chitosan cannot be produced without deacetylation of chitin to form chitosan. Without being bound to any theory, to avoid this step, it is believed that some methods of non-animal chitosan production focus on obtaining chitosan from filamentous fungi mycelium that produce chitosan in the cell walls. However, these methods are limited specifically to species of fungi that produce chitosan in the cells walls. However, there is no yeast species that contain chitosan within the cell walls of vegetative yeast cells.

Figure 1:
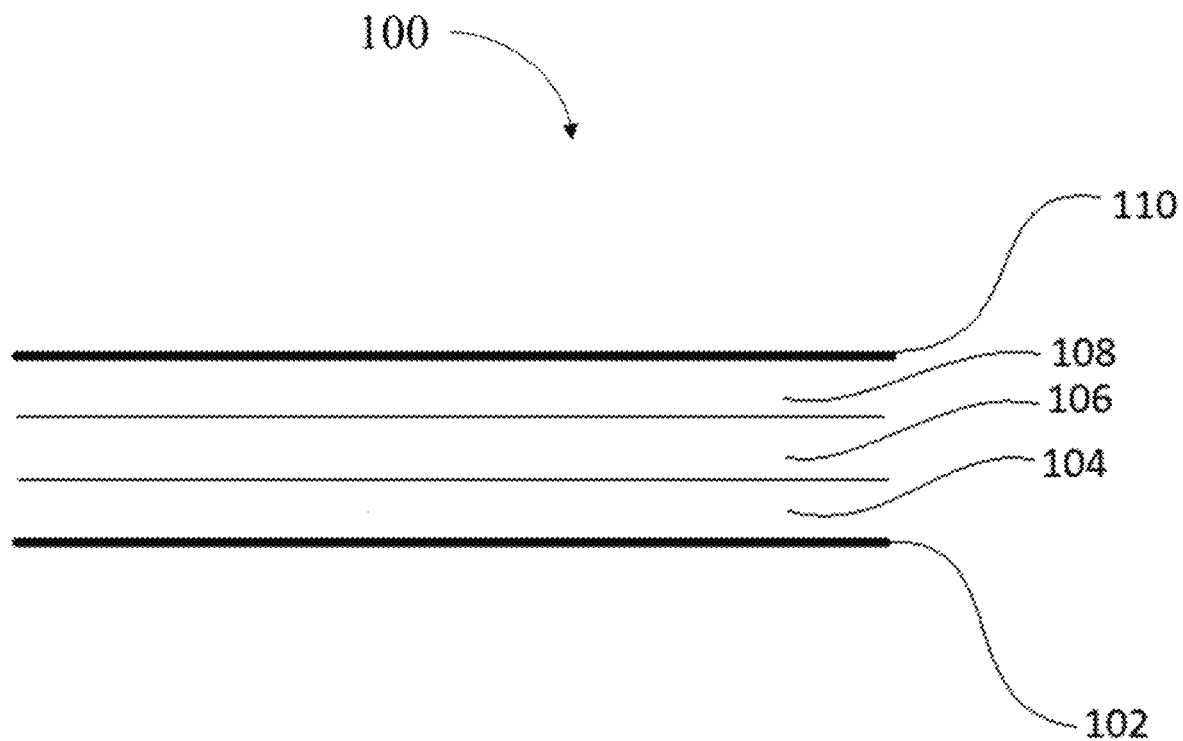
FIG. 1 is a schematic example of a cross-section of a *Saccharomyces cerevisiae* ascospore wall.

Accordingly, examples of the method in the present disclosure produce chitosan by extracting a chitosan product from yeast ascospore walls. In characterized yeast strains, yeast ascospore walls contain chitosan, but no chitin. In an example, FIG. 1 shows a schematic cross-sectional view of a *Saccharomyces cerevisiae* yeast ascospore wall 100. The yeast ascoscpore wall 100 includes an ascospore plasma membrane 102, a mannan layer 104, a beta-1,3-glucan layer 106, a chitosan protective layer 108, and a dityrosine layer 110.

As shown in FIG. 1, the ascospore wall contains chitosan as a structural polysaccharide layer. As such, examples of the method disclosed herein avoid additional processing steps associated with the deacetylation of chitin by extracting chitosan directly from the ascospore wall. Without being bound to any theory, it is believed that since examples of the present disclosure herein do not require a deacetylation step, the method of making chitosan from yeast ascospores may require fewer steps and less resources and labor when compared to methods that require the deacetylation step. Additionally, since examples of the method herein use yeast that are generally recognized as safe (GRAS), the chitosan product produced from the method herein may be used in therapeutic or food applications.

Furthermore, examples of the method in the present disclosure use yeast species that have desirable characteristics for chitosan production. In examples of the method for making a chitosan product, it has advantageously been found that by culturing specific yeast so that yeast cells form a biomass, inducing the yeast cells to undergo meiosis, thereby forming at least one ascospore in each ascus that contains a chitosan protective layer enclosed in an ascospore wall, chitosan may be extracted from the ascospore walls and purified to form a chitosan product.

In an example, a method 200 for making a chitosan product will be described herein with reference to FIG. 2. In this example, the first step 202 includes culturing yeast cells to form a biomass of yeast cells. The culturing of the yeast cells may be performed by plating yeast cells onto any medium that supports yeast cell growth. For example, the medium may be a Yeast Peptone Dextrose (YPD) medium. In another example, the culturing may be performed by inoculating a liquid medium that supports yeast growth with yeast cells. In a further example, the culturing may be performed using a cell culture vessel, a cell retention system, and a media exchange system. The medium may be added to the culture vessel through the cell retention system and replenished using the media exchange system. The yeast may be cultured at a temperature ranging from about 15° C. to about 50° C. Additionally, the yeast may be cultured for a time ranging from about 12 hours to about 120 hours with or without feeding.

Further, in this example, the yeast cells may be a yeast strain that includes any yeast species that produce ascospores containing chitosan and are listed as GRAS by the Food and Drug Administration (FDA). Some examples may include any yeast strain that is a yeast species within the Ascomycota phylum. In additional examples, the yeast strain may be a yeast species within the Saccharomycotina subphyla. Still further, in another example, the yeast strain may be selected from a yeast species within the class *Saccharomyces*.

More particularly, in another example, the yeast strain may be a yeast species within the Genus *Saccharomyces*, Genus *Komagataella*, and Genus *Schizosaccharomyces*. Some examples of suitable yeast species that may be used as the yeast strain include, but are not limited to, *Ogataea methanolica, Ogataea angusta, Saccharomyces cerevisiae, Komagataella pastoris, Komagataella phaffii, Schizosaccharomyces pombe,* and *Schizosaccharomyces japonicus*.

In addition to the above examples, any of the yeast strains previously disclosed herein may be a homothallic self-fertile yeast strain, a heterothallic heterozygous for mating type diploid yeast strain, a heterothallic heterozygous for mating type polyploid yeast strain that are capable of producing ascospores. For example, a heterothallic haploid yeast strain, a heterothallic diploid yeast strain, or a heterothallic polyploid yeast strain may be used. For any heterothallic yeast strain, the sporulating yeast strain may be obtained after fusion of yeast cells with two separate strains or after mating with two separate strains having opposite mating types resulting in the formation of heterozygous for mating type hybrid cells. It is to be understood that any suitable method may be used that fuse or cross any of the strains described herein, such as conventional mating, protoplast fusion, or illegal mating. In an example, the heterothallic yeast strains of opposite mating types may mate with each other to form heterozygous for mating type hybrid cells. In an example, cells of heterothallic haploid yeast strains or the heterothallic homozygous for mating type diploid or polyploid yeast strains with the opposite mating types can mate to each other and form diploid hybrid cells or polyploid heterozygous for mating type hybrid cells. The homothallic self-fertile yeast strain, the heterothallic heterozygous for mating type diploid yeast strain or the heterothallic heterozygous for mating type polyploid yeast strain may be cultured as previously described herein.

In another example, in particular, "a" and "alpha" mating type cells of yeast *Saccharomyces cerevisiae*, can be crossed to each other to form heterozygous for mating type diploid cells, which can be used to produce a biomass of yeast cells. The heterozygous for mating type diploid cells can then be cultured as previously described herein.

In another example, the heterothallic yeast strains may be homozygous for mating type diploid strains. It is to be understood that heterothallic yeast strains of any ploidy with the opposite mating types can mate with each other and form diploid or polyploid hybrid cells that can be cultured to produce a biomass of heterozygous for mating type yeast cells that can be induced to undergo meiosis and form ascospores as previously described herein.

In another example, the yeast strain is a homothallic self-fertile yeast strain of any yeast strain previously mentioned herein. In one example, a homothallic yeast strain of *Saccharomyces cerevisiae* may be incubated in a sporulation medium to induce meiosis and form asci with ascospores. Homothallic self-fertile yeast strains may be cultured as previously described herein.

In another example, the yeast species may be any species previously mentioned herein as a wild-type (WT) yeast strain. In some examples, a wild-type yeast strain can undergo genetic modifications, which prevent formation of non-chitosan layers of the ascospore wall. It is to be understood that a genetic modification may be a mutation, disruption, or deletion of a target gene leading to alteration of biochemical pathways involved in biosynthesis of the outer protective layer in the ascospore wall. The genetic modification may also lead to a change in the biosynthesis or assembly of ascospore wall components, which prevents formation of non-chitosan layers of the ascospore wall.

More particularly, in an example, any yeast species within the Genus *Saccharomyces* may be genetically modified to prevent formation of the outer dityrosine layer of the ascospore wall. For example, the genes DIT1 and DIT2 of the genus *Saccharomyces* are responsible for biosynthesis of factors controlling the assembly of the dityrosine layer 110 of the ascospore wall in the schematic example shown in FIG. 1. Therefore, the heterozygous for mating type diploid and polyploid *Saccharomyces* strains containing inactive or mutated DIT1, DIT2 genes, or a combination thereof, form ascospores without the outer dityrosine layer, which makes the chitosan protective layer 108 shown in the schematic example of FIG. 1 as the outermost layer. Inactivation and mutation of the *Saccharomyces* DIT1 gene, DIT2 gene, or both DIT1 and DIT2 genes can be results of point mutations, disruptions or deletions of the target gene or genes. As such, in examples where a *Saccharomyces* strain heterozygous for mating type genes having mutated or inactivated DIT1 or DIT2, or both DIT1 and DIT2 genes is used, the chitosan product may be produced more efficiently using less resources.

Figure 2:
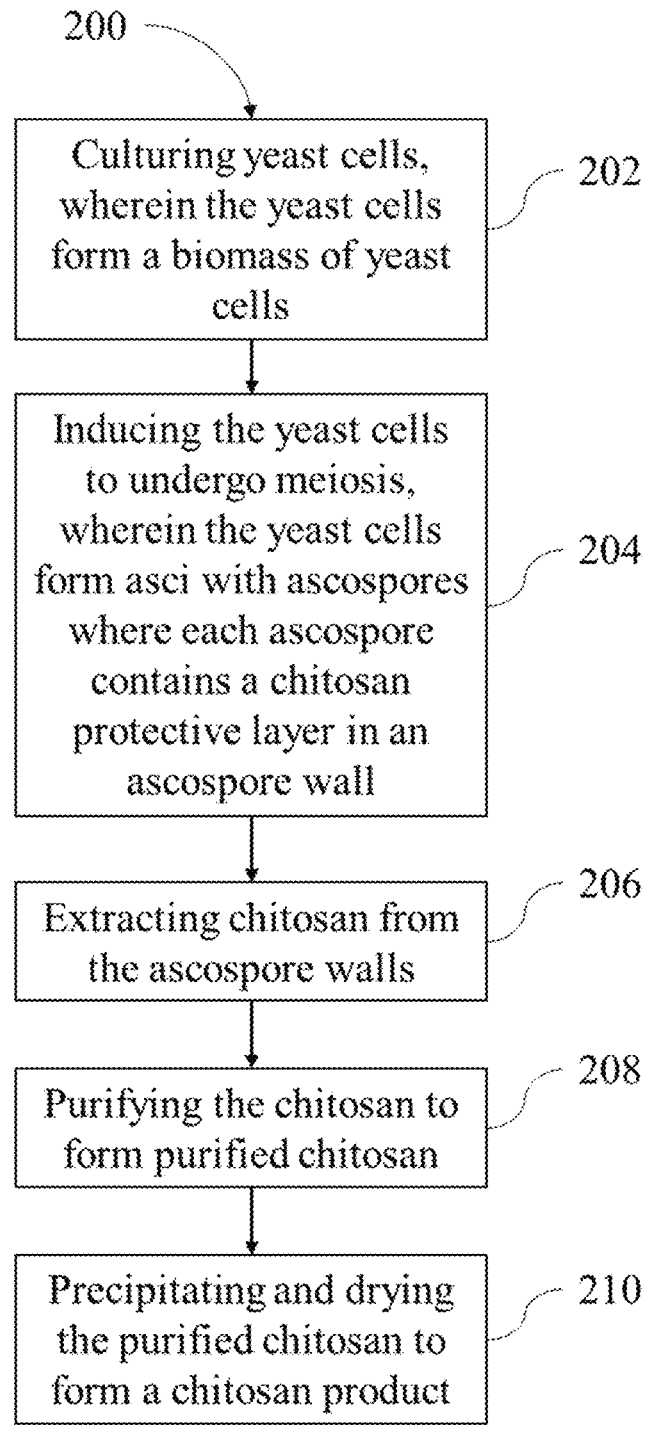
FIG. 2 is a flow diagram illustrating an example of a method for making a chitosan product according to the present disclosure.

Referring now to FIG. 2, the second step 204 includes inducing the yeast cells to undergo meiosis, which causes the yeast cells to form ascospores where each ascospore contains a chitosan protective layer in the ascospore wall. In one example, the yeast cells may be induced into meiosis by incubating in a liquid or on the surface of a solid sporulation medium to induce meiosis and sporulation. In an example, the sporulation medium may be any liquid or solid medium that provides nitrogen starvation. An example of a sporulation medium includes a potassium acetate containing medium.

Figure 3:
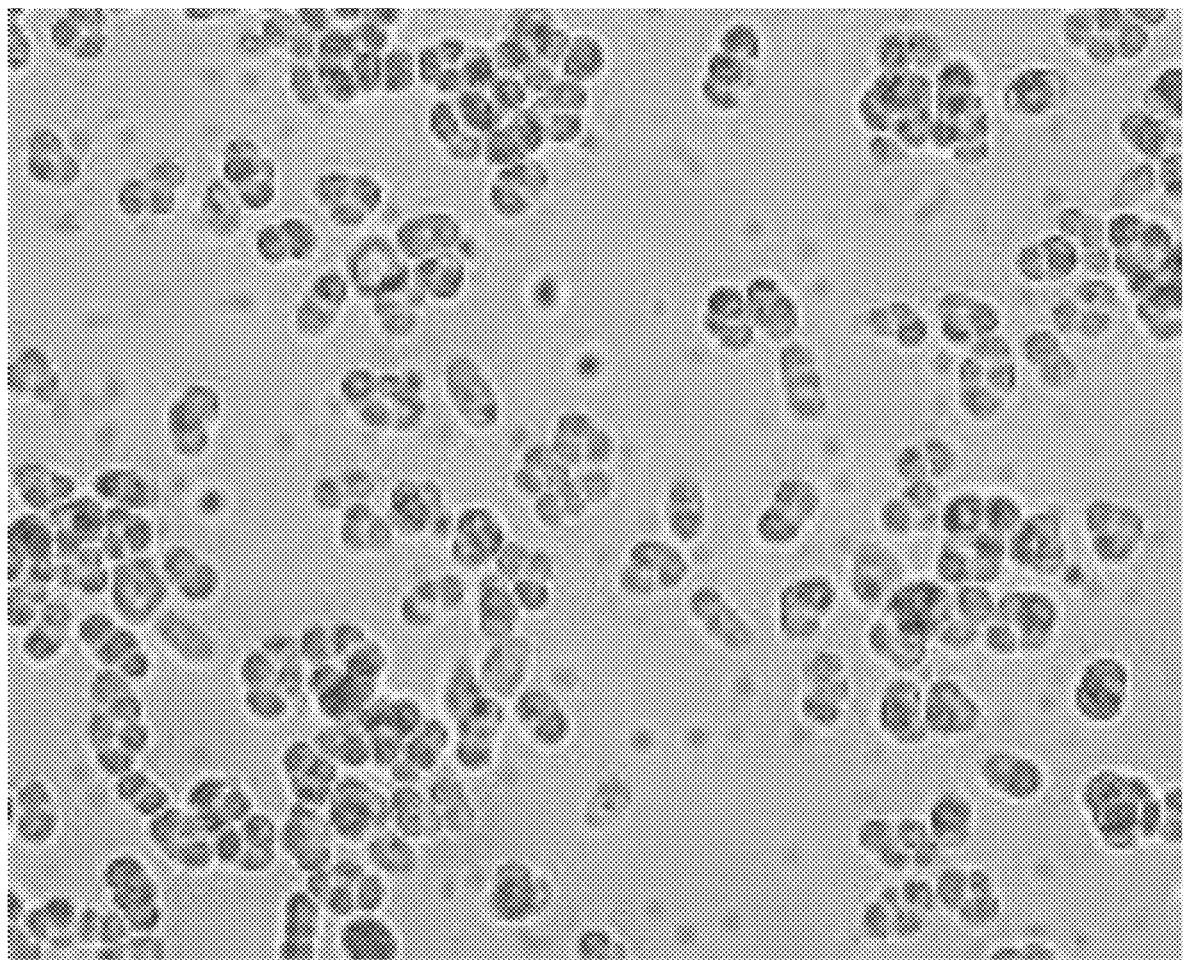
FIG. 3 is a light microscopy image of asci produced by a *Saccharomyces cerevisiae* yeast strain.

After transferring the yeast cells to a sporulation medium, the yeast cells may be incubated in or on the sporulation medium for a time ranging from about 12 hours to about 144 hours. The yeast cells may be incubated until about 10% to about 100% of the yeast cells are converted to asci containing at least one ascospore. The yeast cells are incubated on the sporulation medium at a temperature ranging from about 15° C. to about 50° C. FIG. 3 shows a light microscopy image of an example of asci that are produced after *Saccharomyces cerevisiae* diploid cells have been incubated in the sporulation medium for 48 hours at 30° C.

In another example, the biomass of yeast cells is first transferred to a presporulation medium, incubated in or on the presporulation medium, transferred to a sporulation medium, and incubated in or on the sporulation medium to convert the yeast cells to asci. Examples of presporulation media include any liquid or solid medium that includes a non-fermentable carbon source that is capable of being metabolized. For example, a presporulation medium may include potassium acetate as a non-fermentable carbon source. The yeast cells may be incubated in or on the presporulation medium for a time ranging from about 6 hours to about 72 hours and then transferred to the sporulation medium as previously described herein for further incubation to induce meiosis. The yeast cells are incubated in or on the presporulation medium at a temperature ranging from about 15° C. to about 50° C.

Referring back to FIG. 2, the next step 206 of method 200 for making a chitosan product includes extracting chitosan from the ascospore walls. In an example, the asci containing the ascospores may be resuspended in an acid solution with a pH of less than 7. The suspension may then be heated to a temperature ranging from about 60° C. to about 100° C. for a time ranging from about 1 hour to about 12 hours to extract the acid soluble chitosan from the ascospore walls into the acid solution. Examples of the acid solution include any acid solution that will solubilize the chitosan, such as a solution of acetic acid, hydrochloric acid, formic acid, and combinations thereof. The acid may be present in the acid solution in an amount ranging from about 0.1% w/v to about 50% w/v of the total weight of the acid solution. It is to be understood that the step 206 may be used on the asci after sporulation, on the disrupted asci debris and ascospore wall fragments after disrupting the asci and ascospore walls, on undisrupted ascospores after separating from the disrupted asci, or on ascospore wall fragments of ascospores that have been disrupted after being separated from asci debris. After the chitosan is solubilized, the acid solution is then used for the purification step 208.

Referring to FIG. 2, in some examples of the method 200 the next step 208 for making a chitosan product may include purifying chitosan to form purified chitosan. In an example of step 208, an enzyme may be added to the acid solution containing solubilized chitosan. The enzyme is present in an amount ranging from about 1% v/v to about 30% v/v. Examples of the enzyme include an enzyme that may digest any α (1→4) glucosidic bond linkages between chitosan and glucan, such as an α-amylase (e.g., TERMAMYL®). Further examples of the enzyme include an enzyme that may digest any glucosidic bond linkages between monomers of a glucan polysaccharide.

The enzyme may be added to the acid solution containing the solubilized chitosan and incubated at a temperature ranging from about 4° C. to about 105° C. for a time ranging from about 1 hours to about 24 hours to digest glucosidic bond linkages. The acid solution may have a pH of less than 7 when the enzyme is added to the acid solution containing solubilized chitosan. Residual glucan will precipitate from the solution after enzymatic digestion and may be removed and discarded using solid-liquid separation techniques (e.g., centrifugation).

After the residual glucan is removed, in the next step 210, the purified chitosan may be precipitated and dried to form a chitosan product. The purified chitosan may be precipitated from the enzyme containing solution by washing with an alkaline solution or a polar solution. Examples of the alkaline solution may be any alkaline solution that can raise the pH and precipitate chitosan from the solution, such as a solution of sodium hydroxide or ammonium hydroxide. The base in the alkaline solution may be present in the alkaline solution in an amount ranging from about 3% w/v to about 80% w/v of the total weight of the alkaline solution. The pH of the acid solution may be adjusted to a pH above 7 by adding the alkaline solution. After adjusting the pH of the solution, the chitosan precipitate may be formed by incubating the solution for a time ranging from about 0.25 hours to about 72 hours at temperature ranging from about 2° C. to about 50° C. Examples of a polar solution may be an alcohol or acetone that can change the polarity of the chitosan containing solution and precipitate chitosan. The alcohol or acetone in the polar solution may be present in an amount ranging from about 2.5% or 100% w/v of the total weight of the polar solution. After adjusting the polarity of the solution, the chitosan precipitate may be formed by incubating the solution for a time ranging from about 0.25 hours to about 72 hours at temperature ranging from about 2° C. to about 100° C.

After precipitation, the precipitated chitosan may be dried to form a chitosan product. The precipitated chitosan may be further purified with one or more solid-liquid separation steps. The final chitosan product may be dried and then stored.

In another example, a method 400 for making a chitosan product will be described herein with reference to FIG. 4. In the method 400 for making a chitosan product, the step 402 of culturing yeast cells and step 404 of inducing the yeast cells to undergo meiosis are the same as previously described herein in reference to FIG. 2, steps 202 and 204.

After step 404, in one example, the third step 406 includes disrupting the asci walls or the asci walls and the ascospore walls. In this step 406, the asci walls and ascospore walls may be disrupted sequentially (i.e., disrupting the asci walls and then the ascospore walls) or simultaneously. It is to be understood that disrupting includes enzymatic degradation, mechanically breaking down, or any other suitable means of disrupting the asci walls or the asci walls and ascospore walls.

In one example, the asci walls are first disrupted by incubating the asci in conditions that cause the ascospores to be released from the asci. In an example of incubating the asci in conditions that cause the ascospores to be released, the asci may be added to a buffer solution containing an enzyme to digest the asci walls. The buffer solution may be any buffer solution that provides suitable conditions for enzymatic activity.

After the asci are added to the buffer solution, the asci are incubated with an enzyme that digests the asci walls to release the ascospores. For example, any glucoside hydrolases may be used as the enzyme that is added to the buffer solution, such as β-glucanase or a combination of β-glucuronidase and β-glucuronide sulfatase, lyticase, or zymolyase. The asci may be incubated with the enzyme for a time ranging from about 1 hour to about 6 hours at a temperature ranging from about 4° to about 45° C. to release the ascospores from the asci.

In another example of step 406, disrupting the asci by incubating the asci in conditions that cause the ascospores to be released from the asci may be accomplished by autolyzing the asci to release the ascospore.

In another example of step 406, the asci walls or both the asci walls and ascospore walls may be disrupted by mechanically disrupting the asci walls or the asci walls and the ascospore walls in a high pressure homogenizer. In this example, to disrupt the asci walls only, the asci solution from step 404 is added to a high pressure homogenizer, which has a pressure ranging from about 10 Kpsi to about 30 Kpsi. The asci solution remains in the high pressure homogenizer for a time ranging from about 10 minutes to about 20 minutes. To disrupt both the asci walls and the ascospore walls, the asci solution from step 404 is added to the high pressure homogenizer at a pressure of greater than or equal to 100 Kpsi for the same time range previously stated herein.

In another example of step 406, the asci walls or the asci walls and the ascospore walls may be disrupted by mechanically disrupting the asci walls or the asci walls and the ascospore walls. For example, when disrupting the asci walls, the asci may be added into a suspension containing zirconia beads. The zirconia beads may be added in an amount ranging from about 33% by volume of the total volume of the suspension. The zirconia beads may have a size ranging from about 0.7 mm to about 2.0 mm and a density of about 5.5 g/cc.

In another example, when disrupting the asci walls and the ascospore walls, the asci may be added into a suspension containing zirconia and silica beads. The zirconia and silica beads may be added in an amount ranging from about 33% by volume of the total volume of the suspension. The zirconia and silica beads may have a size ranging from about 0.1 mm to about 2.3 mm and a density of about 3.7 g/cc.

After adding the asci to the suspension with either zirconia beads or zirconia and silica beads, the suspension may then be shaken using a vortex mixer or a cell homogenizer. The asci may be shaken with the suspension at a temperature ranging from about 4° C. to about 42° C. In an example, the suspension may be shaken for a time ranging from about 5 minutes to about 30 minutes. Any suitable vortex mixer or cell homogenizer may be used that is capable of shaking the suspension.

Figure 4:
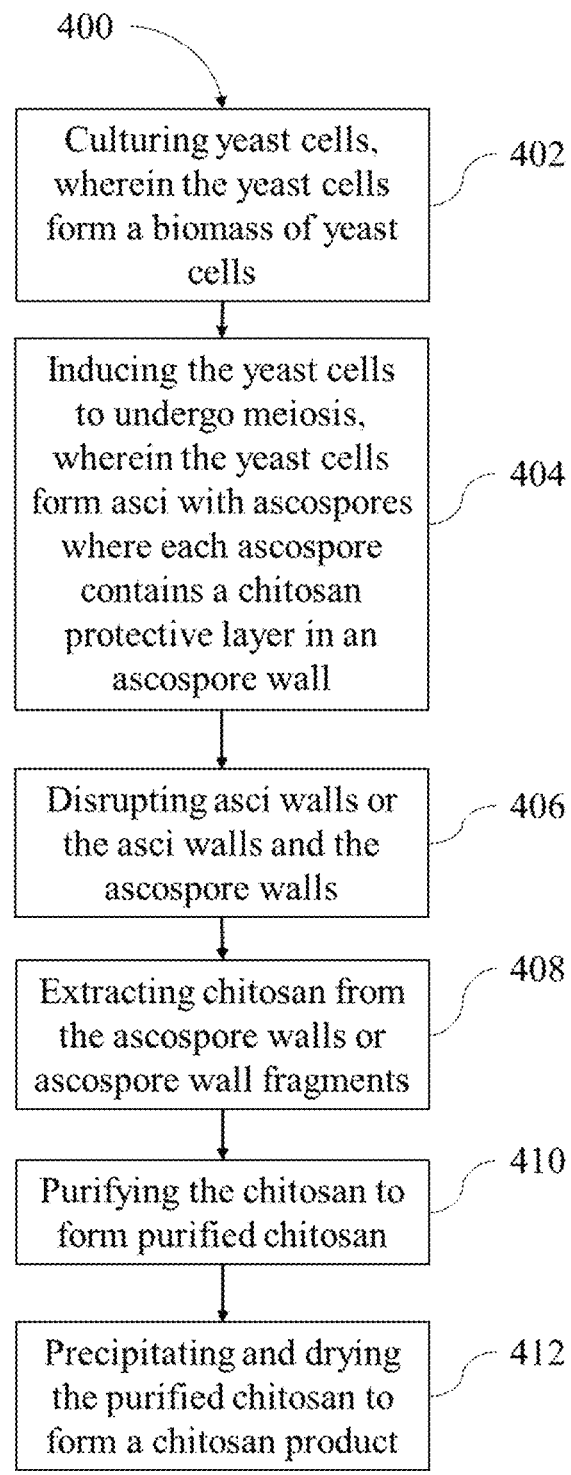
FIG. 4 is another flow diagram illustrating another example of a method for making a chitosan product according to the present disclosure.

Referring now to FIG. 4, after the asci walls or the asci walls and ascospore walls have been disrupted, the chitosan may be extracted from the ascospore walls or the ascospore wall fragments in step 408 as previously described herein in reference to FIG. 2, step 206. After extracting the chitosan from the ascospore walls or ascospore wall fragments in step 408, in some examples of method 400, the chitosan may be purified in step 410 as previously described herein in reference to FIG. 2, step 208. Then, in step 412, the purified chitosan may be precipitated and dried as previously described herein in reference to FIG. 2, step 210. The chitosan product may be dried and stored.

In a third example, a method 500 for making a chitosan product will be described herein with reference to FIG. 5. In the method 500 for making a chitosan product, the step 502 of culturing yeast and step 504 of inducing the yeast cells to undergo meiosis are the same as previously described herein in reference to FIG. 2, steps 202 and 204, respectively. Additionally, in the method 500 for making a chitosan product, the step 506 of disrupting the asci walls is the same as previously described herein in reference to FIG. 4, step 406. However, in this method, only the asci walls are disrupted in step 506. As such, the methods previously described herein that included disrupting only the asci walls are used in step 506.

After disruption of the asci walls, the next step 508 includes separating the ascospores from the debris. It is to be understood that debris includes any yeast cell material except the ascospores, such as the soluble cell components, insoluble cell components, the disrupted ascus and cell wall fragments, the undisrupted yeast cells, and the undisrupted asci. Some examples of separating the ascospores from the debris include density gradient centrifugation or biphasic separation.

In one example, density gradient centrifugation is used to separate the ascospores. First, the ascospores with the debris may be added to a density gradient medium. Any density gradient media may be used that will separate the ascospores from the debris. Some examples of density gradient media include polyhydric alcohols, polysaccharides, colloidal silica, and combinations thereof.

After the ascospores and debris are added to the density gradient medium, the density gradient medium may be centrifuged to separate the ascospores and the debris into separate layers of the density gradient. In an example, centrifugation may be performed for a time ranging from about 30 minutes to about 90 minutes with a speed ranging from about 8,540 RCF to about 19,200 RCF. The temperature during the centrifugation may range from about 2° C. to about 42° C.

After centrifugation, at least two or more layers are formed where the bottom layer contains an ascospore enriched layer with a high concentration of ascospores. The top layers are a debris enriched layer, which contain the debris and a low concentration of ascospores. The top layers of the density gradient may be partitioned (e.g., decanting) and discarded. The bottom layer containing the ascospores may be washed with a nonionic surfactant at least once. Any nonionic surfactant may be used, such as TRITON-X®. The remaining bottom layer may undergo at least one or more solid-liquid separation steps to remove more debris. For example, the bottom layer may be centrifuged for a time ranging from about 3 minutes to about 7 minutes at a speed ranging from about 1000 RCF to about 10,000 RCF. The temperature of the centrifugation may range from about 0° C. to about 42° C. The centrifugation may be repeated one or more times. The remaining bottom layer may form an ascospore pellet that is used in the following extraction step 510.

In another example, a biphasic separation may be used to separate the ascospores from the debris. For biphasic separation, first, the ascospores and the debris may be suspended in an aqueous medium or buffer solution to form a suspension or solution. Some examples of an aqueous medium include any medium that forms a suspension or solution, such as water or yeast culture media. Some examples of buffer solution include any buffer solution that forms a suspension or solution, such as potassium phosphate. Then, the suspension or solution may be mixed with a solution of a different phase for a time ranging from about 1 second to about 1,800 seconds. One example of a solution of different phase than the aqueous medium or buffer solution is a lipophilic solution.

After mixing the solution or suspension with a solution of a different phase, the mixture may be allowed to separate into two or more layers in a separatory funnel or similar apparatus. The ascospore containing chitosan layer can be collected from the separatory funnel or similar apparatus and saved for extraction as described in step 510. The suspension may be centrifuged in a separatory funnel or similar apparatus or subjected to gravity settling to separate the ascospores from the debris to form an ascospore pellet. The ascospore pellet may be used in the subsequent step 510.

In yet another example of biphasic separation, the ascospores are separated from the debris using an aqueous two phase extraction. In this example, the ascospores and the debris are added to an intermediate molecular weight polyether in an aqueous salt solution to form a suspension. After forming the suspension, the ascospores are within the polyether phase, which can be partitioned to form a solution. The debris are in the aqueous salt solution, which can be partitioned and discarded. The remaining solution containing the ascospores may undergo at least one solid-liquid extraction step to form an ascospore pellet. The ascospore pellet may be used in the subsequent extraction step 510.

Referring back to FIG. 5, after the ascospores have been separated from the debris, chitosan may be extracted from the ascospore pellet in step 510. Step 510 may be performed as previously described herein in reference to FIG. 2, step 206. After extracting the chitosan from the ascospore pellet in step 510, in some examples of method 500, the chitosan may be purified in step 512 as previously described herein in reference to FIG. 2, step 208. Then, in step 514, the purified chitosan may be precipitated and dried as previously described herein in reference to FIG. 2, step 210. The chitosan product may be dried and then stored.

Figure 6:
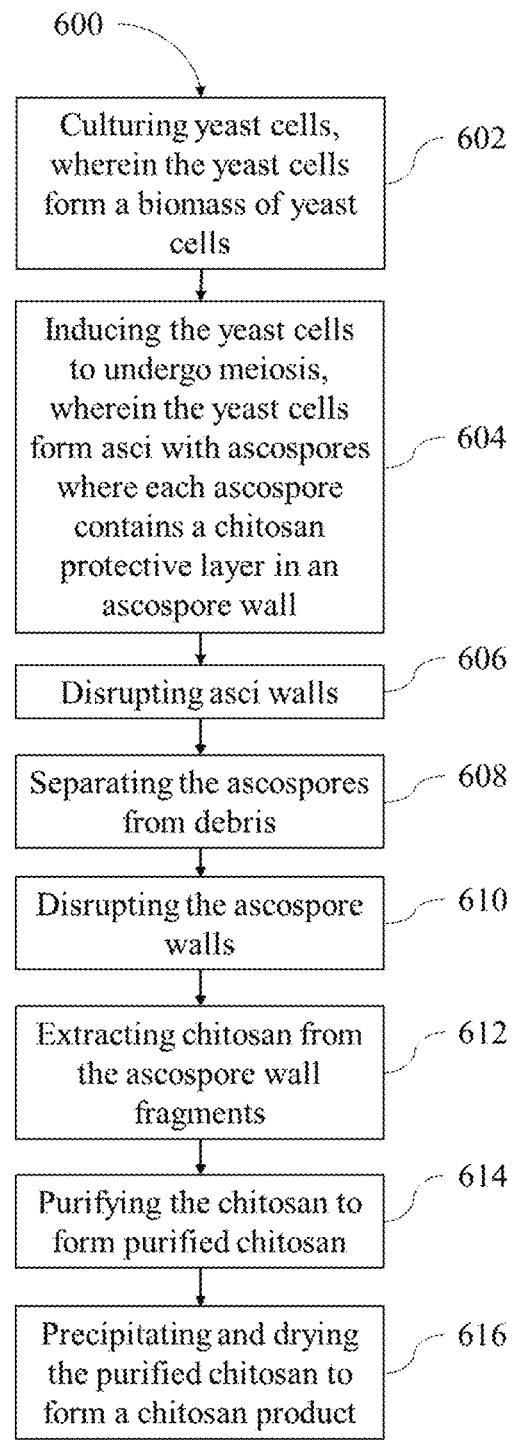
FIG. 6 is another flow diagram illustrating another example of a method for making a chitosan product according to the present disclosure.

In a fourth example, a method 600 for making a chitosan product will be described herein with reference to FIG. 6. In the method 600 for making a chitosan product, the step 602 of culturing yeast and step 604 of inducing the yeast cells to undergo meiosis are the same as previously described herein in reference to FIG. 2, steps 202 and 204, respectively. Additionally, in the method 600 for making a chitosan product, the step 606 of disrupting the asci walls is the same as previously described herein in reference to FIG. 4, step 406. However, in this method 600, only the asci walls are disrupted in step 606. As such, the methods previously described herein that included disrupting only the asci walls are used in step 606.

Figure 5:
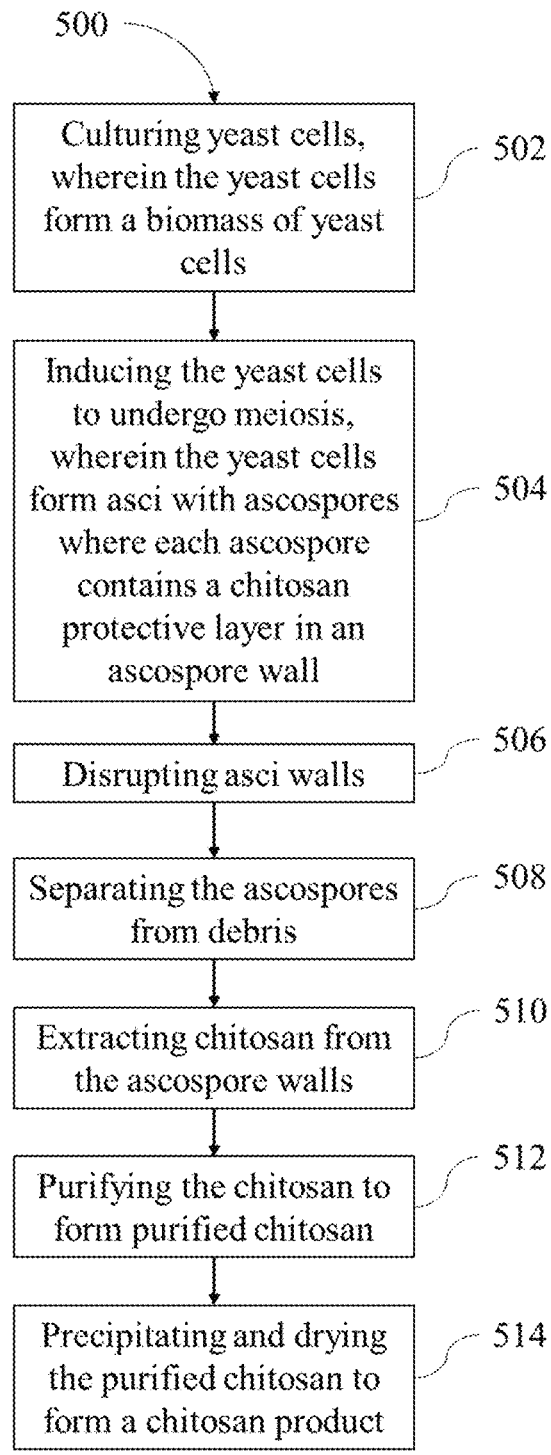
FIG. 5 is another flow diagram illustrating another example of a method for making a chitosan product according to the present disclosure.

Next, in the method 600 of making a chitosan product, in step 608 of separating the ascospores from the debris is the same as previously described herein in reference to FIG. 5, step 508. After step 608, step 610 of method 600 occurs where the ascospore walls are disrupted as previously described herein in reference to FIG. 4, step 406 using any method described to disrupt both asci and ascospore walls. Chitosan may then be extracted from the ascospore wall fragments in step 612. Step 612 may be performed as previously described herein in reference to FIG. 2, step 206. After extracting the chitosan from the ascospore pellet in step 612, in some examples of method 600, the chitosan may be purified in step 614 as previously described herein in reference to FIG. 2, step 208. Then, in step 616, the purified chitosan may be precipitated and dried as previously described herein in reference to FIG. 2, step 210. The chitosan product may be dried and stored.

To further illustrate the present disclosure, examples are given herein. It is to be understood that these examples are provided for illustrative purposes and are not to be construed as limiting the scope of the present disclosure.

EXAMPLES

Strain with Inactive DIT1

A staining procedure was used, which included Calcofluor White, to validate that the DIT1 gene was deleted in the *Saccharomyces cerevisiae* dit1 mutant strain. Samples were stained with Calcofluor White (1 μL in 500 μL McIlvaine's buffer) and mounted on glass slides. Samples were imaged on the same day by confocal microscopy using a DAPI (4',6-Diamidino-2-Phenylindole, Dihydrochloride) wavelength (358 nm and 461 nm), which excite the Calcofluor White.

The staining method allowed identification of the yeast ascospores with Calcofluor White. Calcofluor White can stain chitin and chitosan only if the DIT1 gene is inactive, thereby allowing the dye to stain the inner parts of the ascospore wall. If the ascospores walls are stained by Calcofluor White, then the DIT1 gene was not active. FIG. 7A shows that the dit1 mutant strain does have an inactive DIT1 gene since the ascospore walls are stained. In comparison, a *Saccharomyces cerevisiae* wild-type strain that has a functional DIT1 gene only has the asci wall stained, as shown in FIG. 7B.

Ascospore Generation

A single colony of a *Saccharomyces cerevisiae* dit1 mutant strain from a working cell plate (WCP) was suspended in 5 mL of liquid YPD and incubated overnight at 30° C. with shaking at 250 RPM. The entire working volume culture was inoculated into 200 mL liquid YPD in 1-L baffled flask and incubated at 30° C. with shaking at 250 RPM. After 24 hours of growth, the yeast cells were spun down via centrifugation at 6730 RCF at 4° C. in a sterile 250 ml Nalgene centrifuge bottle. The medium was discarded and the yeast cells were suspended in a 200 mL pre-sporulation medium within a 1-L baffled flask. The culture was incubated for another 24 hours at 30° C. with shaking at 250 RPM.

After another 24 hours of incubation, the yeast cells were spun down via centrifugation at 5640 RCF at 4° C. in a sterile 250 ml Nalgene centrifuge bottle. A pellet of yeast cells formed from centrifugation were then transferred to a sporulation medium. Finally, the culture was incubated in a sporulation medium for 72 hours at 250 RPM and 30° C. and then harvested. To harvest the asci, the asci were first centrifuged at 5640 RCF at 4° C. in a sterile 250 ml Nalgene centrifuge bottle. About 5 grams of wet biomass containing ascospores was harvested from the 200 mL culture. The wet biomass was washed once with MILLI-Q® water and then centrifuged at 2,130 RCF at 4° C. for 5 minutes and the wash supernatant was decanted.

Ascus Disruption and Ascospore Isolation Example 1

Asci pellets were suspended in lysis buffer containing 40 mM Beta-mercaptoethanol (BME), 1.4M sorbitol, 50 mM potassium and sodium phosphate (KPhos) at a pH 7.5 with lyticase containing 25 μL aliquots of 2,000 U/mg lyticase. 5 mL of buffer and 2 aliquots of lyticase were added for each gram of biomass into a 50 ml conical Falcon tube. The suspension was incubated for 3 hours at 30° C. and mixed using a vortex mixer at 250 RPM and then vigorously vortexed with 0.45 μM zirconia glass beads for 10 minutes where the glass beads to culture ratio was 1:1. The ascus disruption was validated by mounting samples stained with 1% methylene blue on a hemocytometer and imaging by light microscopy.

Next, after being mixed with glass beads and suspended in lyticase buffer, the pellet of ascospores and the debris was washed three times with 0.5% TRITON-X® at 5 mL per gram of pellet. The pellet was then purified via Percoll centrifugation gradients. Percoll gradient was prepared by adding 9 mL of Percoll/0.5% TRITON-X®/2.5 M sucrose solutions in following proportions: 1) 8:1:1; 2) 7:2:1; 3) 6:3:1; 4) 5:4:1 into four 40 mL Sorvall high speed centrifuge tubes, respectively. Approximately 1.5 mL of pellet was added to the gradient and centrifuged at 10,000 RPM for 1 hour at 4° C. A majority of the ascospore fraction was concentrated in the bottom of the gradient, whereas less dense cells and other debris remained in three upper layers of the gradient. After centrifugation, the top 27 mL of the gradient were removed and the bottom 9 mL layer was washed three times with 30 mL of 0.5% TRITON-X® and centrifuged at 2,130 RCF and 4° C. for 5 minutes to obtain an ascospore pellet separated from the asci.

Ascus Disruption Example 2

In another example, vigorous glass-bead mixing of a *Saccharomyces cerevisiae* dit1 mutant yeast strain culture, which included asci containing ascospores, led to disruption of asci walls. 300 µL of 0.45 µm zirconia beads were added to 200 µL of dense water suspensions of sporulation culture in 2 mL round-bottom plastic tubes and mixed using a vortex mixer for 10 minutes. The suspension was then centrifuged at 13,000 rpm for 12 minutes. A pellet formed in the bottom layer of the suspension.

The pellet was isolated and stained with Calcofluor White, which selectively dyes chitin and chitosan to determine if the pellet contained chitin and chitosan. The results showed the presence of chitin and chitosan, indicating that the mixture contained asci walls (with chitin) and ascospore walls (with chitosan). This data demonstrates that mechanical digestion breaks down the asci and ascospore walls in a single mixing step, thereby allowing chitosan to be extracted in the following step.

Chitosan Extraction

A sample of ascospores was obtained. The sample included approximately 0.2 grams of wet ascospore weight from the bottom Percoll gradient layer. The sample was suspended in 30 mL of 2% acetic acid. The chitosan was extracted from the ascospores by heating the mixture to 95° C. for 5 hours in a round bottom flask with a condenser.

The mixture was cooled to room temperature and centrifuged at 13,300 RCF and 4° C. for 10 minutes in a 50 mL Falcon conical tube to separate the ascospore debris. The supernatant containing the chitosan product in a solution was collected into a 50 mL Falcon conical tube. The pH of the collected solution was raised to a pH 12 using a Thermo Fisher pH probe to track the pH change using about 4 mL to 5 mL of 2.0M NaOH. The solution was incubated at 4° C. for about 48 hours to about 72 hours until a chitosan product formed as a white precipitate in the solution.

The white precipitate was centrifuged at 13,300 RCF and 4° C. for 10 minutes in a 50 mL Falcon conical tube. The supernatant was then decanted, and the white precipitate was transferred into 2 mL Eppendorf tubes and then washed three times with deionized water. After each wash step, a subsequent centrifugation at 2,130 RCF and 4° C. for 5 minutes was performed. The final chitosan containing pellet was stored in the freezer at −20° C.

Spectroscopy Results

Fourier-transform infrared (FT-IR) spectroscopy was used to analyze the final chitosan product. In order to analyze the final product chitosan, two different samples were analyzed using FT-IR spectroscopy. The first sample was a vegetative cell product from a *Saccharomyces cerevisiae* strain. The second sample was an ascospore layer product from *Saccharomyces cerevisiae* strain.

Both samples were analyzed and compared to the analytical standard of chitin and chitosan. It is believed that if chitin is present in a sample, there is a larger peak between 1800 cm$^{-1}$ to 1600 cm$^{-1}$ representing the presence of an acetyl group. However, if chitosan is present, there is no peak or a very small peak between 1800 cm$^{-1}$ to 1600 cm$^{-1}$. Both samples were analyzed using FT-IR spectroscopy and presented as an overlay showing FT-IR spectra with the % transmittance (Y-axis labeled "% T") vs. wavenumber (X-axis labeled "cm$^{-1}$").

Figure 8:
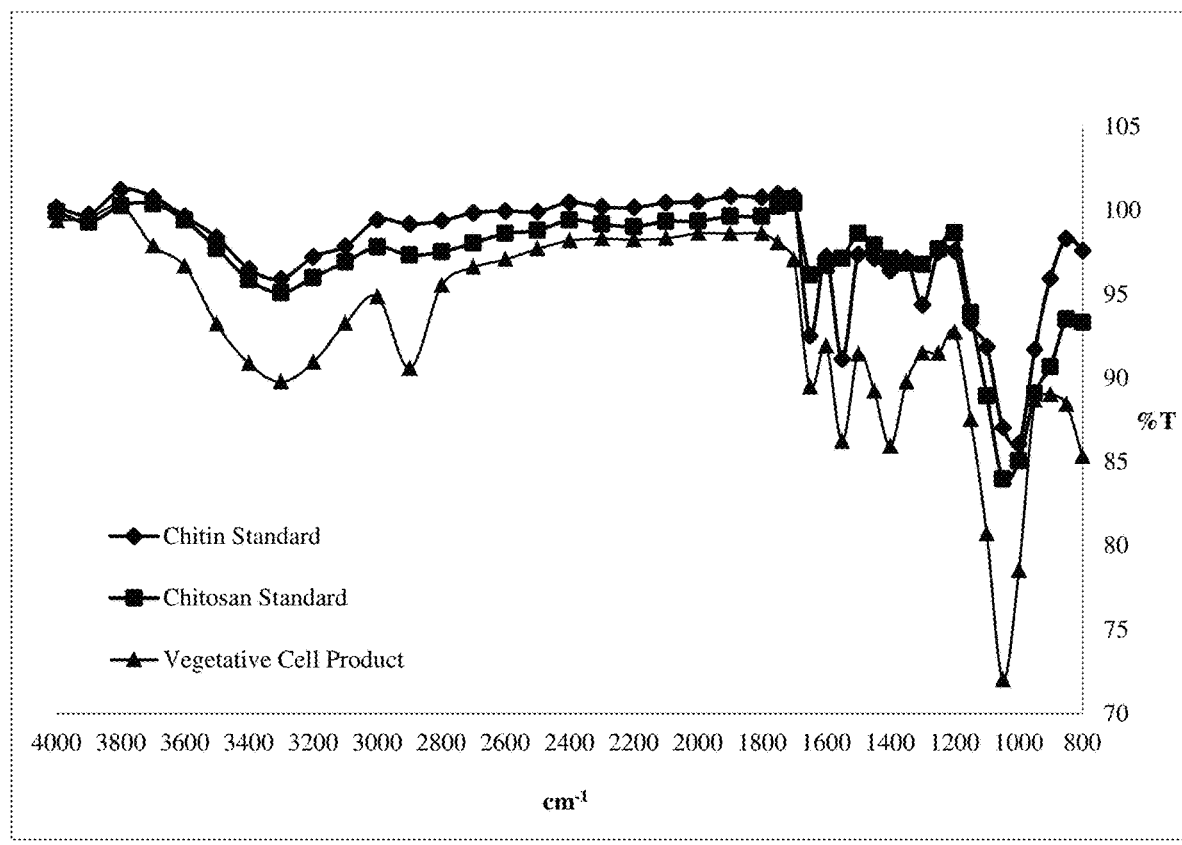
FIG. 8 is an overlay showing FT-IR spectra illustrating the % transmittance (Y-axis labeled "% T") vs. wavenumber (X-axis labeled "$cm^{-1}$") of a product from a vegetative yeast cell of a *Saccharomyces cerevisiae* yeast strain, a chitosan standard, and a chitin standard.

The first sample was a vegetative cell product from a *Saccharomyces cerevisiae* strain that was analyzed and compared to the analytical standard of chitin and chitosan. As shown in FIG. 8, chitin and the vegetative cell layer both contain sharp peaks in the 1620 cm$^{-1}$ region. This supports the fact that the vegetative cell layer contains chitin in the cell wall rather than chitosan. In comparison, the chitosan standard spectrum does not exhibit a peak in the 1620 cm$^{-1}$ region, which is expected since it is the deacetylated form of chitin.

Figure 9:
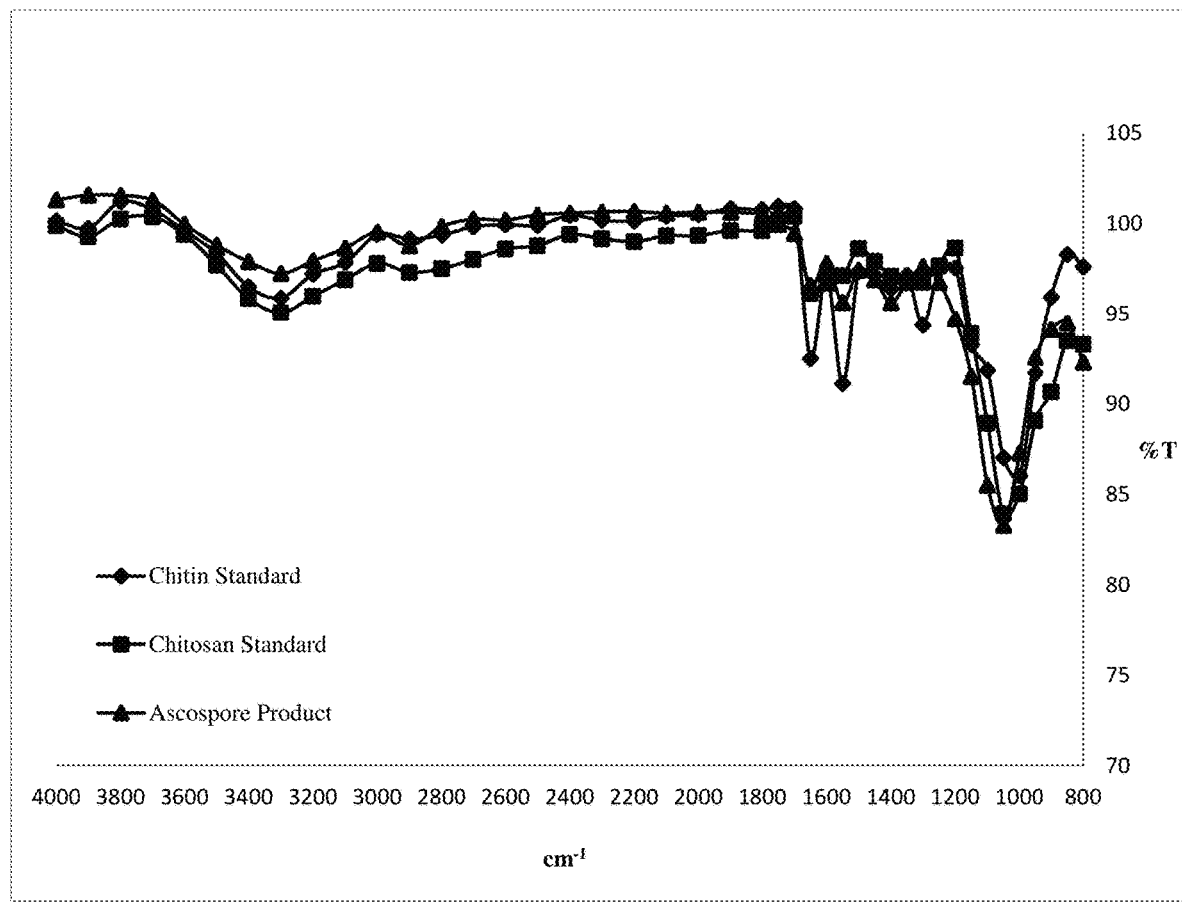
FIG. 9 is an overlay showing FT-IR spectra illustrating the % transmittance (Y-axis labeled "% T") vs. wavenumber (X-axis labeled "$cm^{-1}$") of a product from an ascospore of a *Saccharomyces cerevisiae* yeast strain and a chitosan standard.

The second sample was an ascospore product from a *Saccharomyces cerevisiae* strain. As shown in FIG. 9, the ascospore product and the chitosan standard did not have any peaks in the 1620 cm$^{-1}$ region. Therefore, this data demonstrates that chitosan was present in the ascospore product, but not chitin.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Unless otherwise stated, any feature described herein can be combined with any aspect or any other feature described herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.1 w/v to about 20 w/v should be interpreted to include not only the explicitly recited limits of from about 10 w/v to about 15 w/v, but also to include individual values, such as 3 w/v, 7 w/v, 13.5 w/v, etc., and sub-ranges, such as from about 5 w/v to about 15 w/v, etc.

In describing and claiming the examples disclosed herein, the singular forms "a", "an", and "the" include plural referents unless the context clearly dictates otherwise.

What is claimed is:

1. A method of making a chitosan product, consisting of:
   culturing yeast cells, wherein the cultured yeast cells form a biomass of yeast cells, wherein the yeast cells are genus *Saccharomyces* yeast cells;
   inducing the cultured yeast cells to undergo meiosis by incubating the biomass of yeast cells in a sporulation medium for a time ranging from 12 hours to 144 hours, thereby converting 10% to 100% of the biomass of yeast cells to asci containing ascospores;
   disrupting asci walls and separating ascospore walls from the disrupted asci walls;
   extracting chitosan from the ascospore walls by heating the ascospore walls in an acid solution containing 0.1% w/v to 50% w/v acid to a temperature ranging from 60° C. to 100° C. for a time ranging from 1 hour to 12 hours to thereby obtain acid soluble chitosan;
   purifying the acid soluble chitosan; and
   precipitating the purified chitosan from the acid solution by incubating in an alkaline solution containing sodium hydroxide in an amount ranging from 3% w/v to 30% w/v of a total weight of the alkaline solution; and
   drying the purified chitosan to form a chitosan product.

\* \* \* \* \*